United States Patent
Kalke

(10) Patent No.: US 8,284,196 B2
(45) Date of Patent: Oct. 9, 2012

(54) METHOD AND SYSTEM FOR RECONSTRUCTING A MODEL OF AN OBJECT

(75) Inventor: Martti Kalke, Tuusula (FI)

(73) Assignee: GE Healthcare Finland Oy (FI)

(*) Notice: Subject to any disclaimer, the term of this patent is extended or adjusted under 35 U.S.C. 154(b) by 727 days.

(21) Appl. No.: 12/280,307

(22) PCT Filed: Feb. 24, 2006

(86) PCT No.: PCT/FI2006/000072
§ 371 (c)(1),
(2), (4) Date: Aug. 21, 2008

(87) PCT Pub. No.: WO2007/096453
PCT Pub. Date: Aug. 30, 2007

(65) Prior Publication Data
US 2009/0237402 A1   Sep. 24, 2009

(51) Int. Cl.
*G06K 9/34* (2006.01)
*G06T 17/00* (2006.01)
(52) U.S. Cl. ........................ 345/424; 382/173
(58) Field of Classification Search .......... None
See application file for complete search history.

(56) References Cited

U.S. PATENT DOCUMENTS

| | | | |
|---|---|---|---|
| 6,556,696 B1 * | 4/2003 | Summers et al. | 382/128 |
| 7,072,515 B2 * | 7/2006 | Al-Kofahi et al. | 382/199 |
| 7,787,673 B2 * | 8/2010 | Vaz et al. | 382/128 |

FOREIGN PATENT DOCUMENTS

| EP | 1403824 A2 | 3/2004 |
|---|---|---|
| WO | 2004/068412 A1 | 8/2004 |

OTHER PUBLICATIONS

R. Koppe et al, "3D Reconstruction of Cerebral Vessel Malformations Based on Rotational Angiography (RA)", Computer Assisted Radiology and Surgery, Proceedings of the International Symposium on CARS, 1997, pp. 145-151 (XP000938242).
International Search Report for parent application PCT/FI2006/000072, having a mailing date of Oct. 20, 2006.
Hassan, Hossam et al, "A Volumetric 3D Model of the Human Jaw", International Congress Series, vol. 1281, May 1, 2005, pp. 1244-1249.
Soussen, C. And Mohammad-Djafari, A., "Contour-Based Models for 3D Binary Reconstruction in X-ray Tomography", AIP Conference Proceedings, American Institute of Physics, New York, U.S., No. 568, Jan. 1, 2001, pp. 543-554.
Supplementary European Search Report for priority application EP 06 70 8931, having a completion date of Jun. 27, 2012.

* cited by examiner

*Primary Examiner* — Ulka Chauhan
*Assistant Examiner* — Anh-Tuan V Nguyen
(74) *Attorney, Agent, or Firm* — Andrus, Sceales, Starke & Sawall, LLP

(57) ABSTRACT

The invention relates to a method, system and computer program product for reconstructing a model of an object of projection data advantageously gathered by X-ray imaging. It is characteristic for the invention, that after a point of at least one object of interest from at least two projection images is marked as a seed point, where said point locates inside the object of interest in the corresponding projection image, the model of the object of projection data is reconstructed by adding plurality of elementary object elements around the marked seed point in each direction until a criteria, such as likelihood criteria, is fulfilled in said direction, where priori information relating to the object of interest is connected with said elementary object element.

7 Claims, 1 Drawing Sheet

METHOD AND SYSTEM FOR RECONSTRUCTING A MODEL OF AN OBJECT

CROSS-REFERENCE TO RELATED APPLICATION

This application is the U.S. national stage application of International Application No. PCT/FI2006/000072, filed Feb. 24, 2006, which International application was published on Aug. 30, 2007, as International Publication No. WO 2007/096453 A1 in the English language, which application is incorporated herein by reference.

TECHNICAL FIELD OF THE INVENTION

The invention relates to a method, system and computer program product for reconstructing of projection data of a model of an object. Especially the invention relates to reconstructing of projection data of a model of an object gathered by X-ray imaging.

BACKGROUND OF THE INVENTION

In the current commercial X-ray based 3D medical systems (e.g. computer tomography, CT) the attenuation of X-rays in one volume unit (voxel) inside the volume is typically defined basing on the values of the pixel values on projection images. This can be done, like in known prior art, basing on the fact that each pixel value is an integral of attenuation along the X-ray beam in the volume. Therefore an inner structure and details of an object can be determined very accurately.

However, there are modalities, where there is more interest on boundaries of the objects than in the details inside the object itself. For example, in implantology distances and relations on 3D space are more important information than the inner structure of the object to define the optimal shape of the implant. Thus defining the boundaries or contours of the objects fast, advantageous and reliable way are very important feature in many medical imaging situations.

Methods for defining the boundaries or contours of the objects are known from prior art. According to the prior art gray scales of voxels of a projection image including also image information of objects are first determined, whereafter the gray-scale image has been segmented. There are two fundamentally different approaches to image segmentation in practice: the first methods looks for differences in pixel grey level and in that way try to detect a structures boundary; the second methods looks for similarity in pixel grey level and thereby detect an objects region. In ancillary procedure also shapes of the objects in the image will be detected, whereafter surfaces of the objects, which satisfy projection data can be achieved. This kind of method, which goal is to find the surface of the object, and which satisfies the projection data, is called a surface based reconstruction method.

The major problem in most of the known surface based reconstruction methods is that the methods need the number of objects inside the volume as priory information, methods are complicated needing powerful computers to being executed and they comprise number of steps to achieve desired results, and typically provide too detailed segmented model from which a surface model of the object is then reconstructed. This is, however, time and power consuming.

SUMMARY OF THE INVENTION

It is an object of the invention to provide a method, system and computer program product for reconstructing a model of an object of projection data gathered by X-ray imaging.

The object of the invention is achieved by marking a point of at least one object of interest from at least two projection images as a seed point, where said point locates inside the object of interest in the corresponding projection image, and reconstructing a model of the object by adding a plurality of elementary object elements around the marked seed point in each direction until a criteria, such as likelihood criteria, is fulfilled in said direction. Further the object of the invention is achieved by connecting priori information relating to the object of interest with said elementary object elements, where said priori information concerns at least one of the following character of the object of interest: size, shape, type, location, volume and density.

The invention relates to a method of reconstructing a model of an object in medical imaging, where the method comprises the steps of:
   marking a point of at least one object of interest from at least two projection images as a seed point, where said point locates inside the object of interest in the corresponding projection image, and
   adding plurality of elementary object elements around the marked seed point in each direction until a criteria is fulfilled in said direction in order to reconstruct the model of the object of projection data, where priori information relating to the object of interest is connected with said elementary object element.

The invention further relates to a system for reconstructing a model of an object in medical imaging, where the system is adapted, after a point of at least one object of interest from at least two projection images is marked as a seed point, where said point locates inside the object of interest in the corresponding projection image, to reconstruct the model of the object of projection data by adding plurality of elementary object elements, with which priori information relating to the object of interest is connected, around the marked seed point in each direction until a criteria is fulfilled in said direction.

Furthermore the invention relates to a computer program product for reconstructing a model of an object in medical imaging, where the computer program product, when run on a computer, is adapted, after a point of at least one object of interest from at least two projection images is marked as a seed point, where said point locates inside the object of interest in the corresponding projection image, to reconstruct the model of the object of projection data by adding plurality of elementary object elements, with which priori information relating to the object of interest is connected, around the marked seed point in each direction until a criteria is fulfilled in said direction.

According to an exemplary embodiment of the invention gray scales of voxels of a projection image including also image information of objects are first determined, whereafter a gray-scale image is segmented. Then, an arbitrary point of an object or objects of interest from at least two projection images is/are marked as a seed point(s), where the point locates inside the object, a surface of which is elected to being reconstructed. Because of this marking step, the reconstruction "knows" the number of objects and also the location of one voxel per object (a seed point), which is inside the object of interest in the corresponding projection image unambiguously.

The reconstruction of projection data of the model is advantageously implemented by adding plurality of elementary object element around the marked seed point in each direction until a criteria is fulfilled in said direction. The shape and/or size of the elementary object element added around the marked seed point may depend on characters of a tissue in question and its typical geometrical characters. Further according to an embodiment of the invention said criteria is fulfilled when value of model in a certain place in the surface model differs from corresponding imaged value over predetermined degree.

According to a second exemplary embodiment of the invention priori information relating to the object of interest is connected with elementary object element added around the seed point. Used priori information relates to at least one of the following character of the object of interest, such as for example size, shape, type, location, volume and density. Moreover priori information may relate to characters of a tissue in question and its typical geometrical characters, whereupon the shape and/or size of the elementary object element to be added around the seed point can be optimised, for example.

Number of objects can be marked in the image, whereupon even 3D model can be reconstructed describing relation between different tissues, such as in implatology imaging. After the reconstruction, the volume can be viewed in slices or as a 3D volume normally, for example.

The invention offers numerous advantages over known prior art, such as a surface model of an object, which can be directly reconstructed from a segmented image according to the invention. Moreover the use of priori information with seed point method the reconstruction process is fast and accurate.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

BRIEF DESCRIPTION OF THE DRAWINGS

Next the invention will be described with reference to exemplary embodiments in accordance with the accompanying drawings, in which.

DETAILED DESCRIPTION

Figure 1:
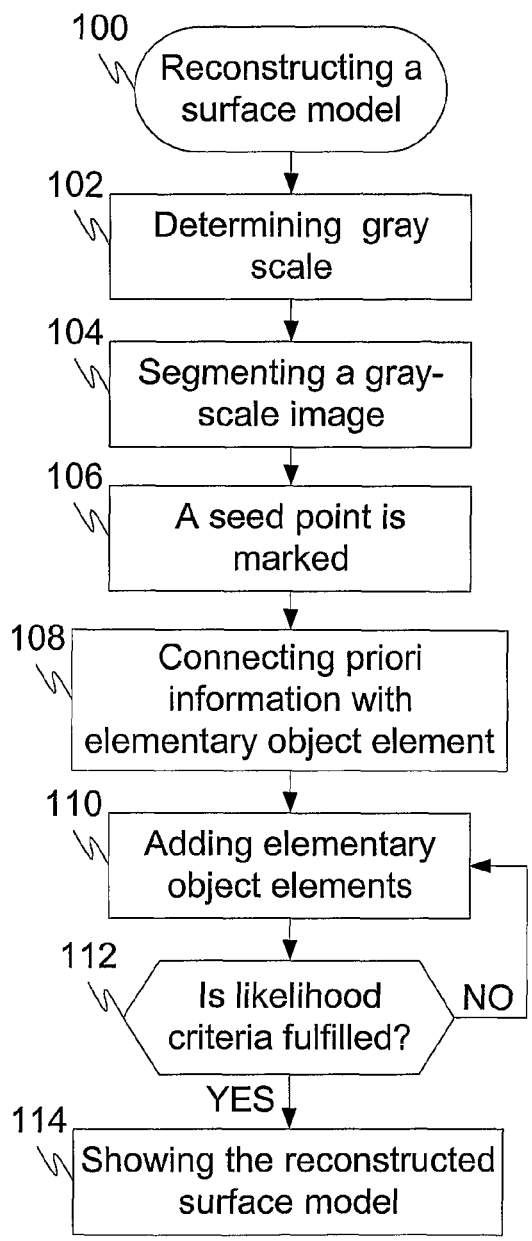
FIG. 1 illustrates a flow diagram of an exemplary method of reconstructing of projection data of a surface model of an object in medical imaging according to an advantageous embodiment of the invention.

FIG. 1 illustrates a flow diagram 100 of an exemplary method of reconstructing of projection data of a surface model of an object in medical imaging according to an advantageous embodiment of the invention. At first in step 102 gray scales of voxels of a projection image including also image information of objects are determined, whereafter in step 104 a gray-scale image is segmented.

In step 106 an arbitrary point of an object or objects of interest from at least two projection images is/are marked as a seed point(s), where the point locates inside the object, a surface of which is elected to being reconstructed. In step 108 priori information is connected with said seed point(s) and also with the object being reconstructed, whereupon the shape and/or size of the elementary object element added around the marked seed point can be optimised based on the characters of a tissue in question and its typical geometrical characters, for example. Furthermore the characters of the added elementary object elements may depend on size, shape, type, and location of the object of interest, for example.

In step 110 the reconstruction of projection data of the surface model is advantageously implemented by adding plurality of elementary object element around the marked seed point in each direction until the likelihood criteria is fulfilled in said direction. In step 112 it is checked whether the likelihood criteria is fulfilled. If the likelihood criteria is fulfilled in each direction the reconstructed surface model can be displayed in step 114. Otherwise further elementary object elements are added in step 110 at least in direction, where the likelihood criteria is not fulfilled yet. The likelihood criteria is advantageously fulfilled when value of model in a certain place in the surface model differs from corresponding imaged value over predetermined degree.

Now it should be noted that steps 102 and 104 are optional and they are not to be interpreted to pose limitations to the applicability of the appended claims.

Figure 2:
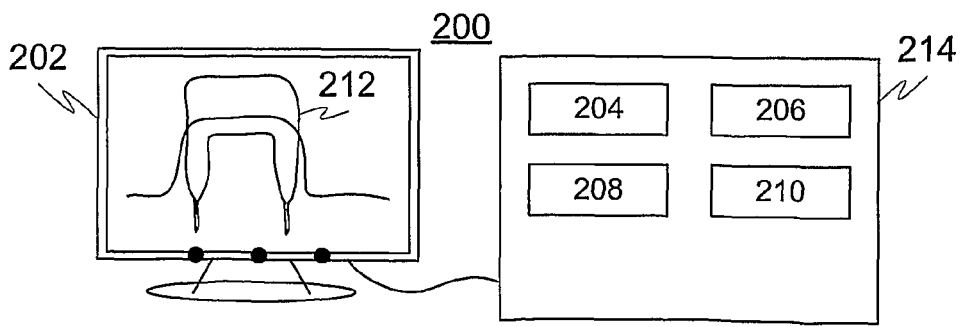
FIG. 2 illustrates an exemplary system for reconstructing of projection data of a surface model of an object in medical imaging according to an advantageous embodiment of the invention.

FIG. 2 illustrates an exemplary system 200 for reconstructing of projection data of a surface model of an object in medical imaging according to an advantageous embodiment of the invention, where the system advantageously comprises display 202 for displaying projection images. The system 200 also comprises means 204, such as a control means, for allowing to marking of a seed point of an object or objects of interest from at least two projection images.

Further the system 200 comprises means 206 for detecting likelihood criteria, whether it is fulfilled, and means 208 for generating elementary object element, which shape and/or size is optimised based on the characters of a tissue in question and its typical geometrical characters, for example. Furthermore the characters of the added elementary object elements may depend on size, shape, type, location, volume and density of the object of interest, for example.

Still the system 200 comprises means 210 for adding elementary object elements around the seed point and means for creating and displaying the reconstructed surface model 212 on the display 202, such as an implantology image of a tooth. Furthermore a segmented 3D model from the reconstructed surfaces of plurality of objects can be created and displayed by means 210.

In addition it should be noted that the system can be implemented by a computer 214, but this is, however, optional.

Figure 3:
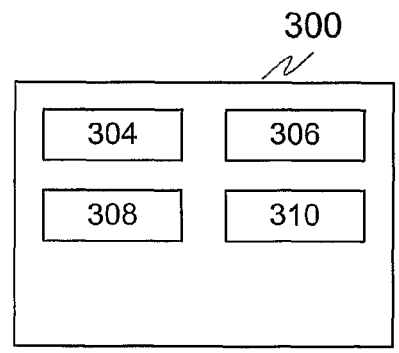
FIG. 3 illustrates an exemplary computer program product for reconstructing of projection data of a surface model of an object in medical imaging according to an advantageous embodiment of the invention.

FIG. 3 illustrates an exemplary computer program product 300 for reconstructing of projection data of a surface model of an object in medical imaging according to an advantageous embodiment of the invention. The computer program product may advantageously comprise the following code means for performing a certain task, when said computer program product 300 is run on the computer 214, such as code means 304 for connecting a given seed point with a certain object or objects of interest.

Further the computer program product 300 comprises code means 306 for detecting likelihood criteria, whether it is fulfilled, and code means 308 for generating elementary object element, which shape and/or size is optimised based on the characters of a tissue in question and its typical geometrical characters, for example. Furthermore the characters of the added elementary object elements may depend on size, shape, type, location, volume and density of the object of interest, for example.

Still the computer program product 300 comprises code means 310 for adding elementary object elements around the seed point and means for creating and displaying the reconstructed surface model 212 on the display 202, such as an implantology image of a tooth. Furthermore a segmented 3D model from the reconstructed surfaces of plurality of objects can be created and displayed by means 310.

The invention has been explained above with reference to the aforementioned embodiments, and several advantages of the invention have been demonstrated. It is clear that the invention is not only restricted to these embodiments, but comprises all possible embodiments within the spirit and scope of the inventive thought and the following patent claims.

The invention claimed is:

1. A method of reconstructing a model of an object in medical imaging, the method comprising the steps of:
   marking a point of at least one object of interest from at least two projection images as a seed point, where said point locates inside the object of interest in the corresponding projection image, and
   adding, by a processor, plurality of points around the marked seed point in each direction until a criteria is fulfilled in said direction in order to reconstruct the model of the object of projection data, where priori information relating to the object of interest is connected with said plurality of points; wherein at least one of the shape and size of the point to be added around the marked seed point depends on characters of a tissue in question and its typical geometrical characters.

2. A method according to claim 1, wherein said priori information relates to at least one character of the object of interest selected from the group consisting of size, shape, type, and location.

3. A method according to claim 1, wherein said criteria is fulfilled when value of model in a certain place in the surface model differs from corresponding imaged value over predetermined degree.

4. A method according to claim 1, wherein projection data is gathered by X-ray imaging.

5. A method according to claim 1, wherein a segmented 3D model is created from reconstructed surfaces of plurality of objects.

6. A system for reconstructing a model of an object in medical imaging, the system comprising: a computer that is programmed so that after a point of at least one object of interest from at least two projection images is marked as a seed point, where said point locates inside the object of interest in the corresponding projection image, the computer reconstructs the model of the object of projection data by adding plurality of points, with which priori information relating to the object of interest is connected, around the marked seed point in each direction until a criteria is fulfilled in said direction; wherein at least one of the shape and size of the point to be added around the marked seed point depends on characters of a tissue in question and its typical geometrical characters.

7. A nontransient computer readable medium programmed with computer readable code for reconstructing a model of an object in medical imaging, wherein the nontransient computer readable medium programmed with computer readable code, when run on a computer, is adapted, after a point of at least one object of interest from at least two projection images is marked as a seed point, where said point locates inside the object of interest in the corresponding projection image, to reconstruct the model of the object of projection data by adding plurality of points, with which priori information relating to the object of interest is connected, around the marked seed point in each direction until a criteria is fulfilled in said direction; wherein at least one of the shape and size of the points to be added around the marked seed point depends on characters of a tissue in question and its typical geometrical characters.

* * * * *